United States Patent [19]

Mills

[11] Patent Number: 4,840,574

[45] Date of Patent: Jun. 20, 1989

[54] MULTICONNECTOR

[75] Inventor: Simon F. Mills, Princes Risborough, United Kingdom

[73] Assignee: European Atomic Energy Community (Euratom), Luxembourg, Luxembourg

[21] Appl. No.: 261,872

[22] Filed: Oct. 25, 1988

[30] Foreign Application Priority Data

Nov. 10, 1987 [LU] Luxembourg ............................ 87043
Feb. 2, 1988 [LU] Luxembourg ............................ 87125

[51] Int. Cl.$^4$ ............................................. H01R 4/60
[52] U.S. Cl. ...................... 439/191; 439/372; 439/378
[58] Field of Search .............. 439/310, 357, 371, 372, 439/369, 370, 374, 376, 378, 380, 191, 192, 193, 194, 195

[56] References Cited

U.S. PATENT DOCUMENTS

| | | | |
|---|---|---|---|
| 2,487,801 | 11/1949 | Healy, Jr. ............................ | 439/369 |
| 2,634,311 | 4/1953 | Darling ................................ | 439/191 |
| 2,724,094 | 11/1955 | Lewis .................................. | 439/372 |
| 3,673,541 | 6/1972 | Volinskie ............................. | 439/195 |
| 4,076,361 | 2/1978 | Campbell ........................... | 439/374 X |
| 4,303,292 | 12/1981 | McNeel . | |
| 4,659,156 | 4/1987 | Johnescu et al. ................ | 439/378 X |
| 4,714,433 | 12/1987 | Rider, Jr. ............................ | 439/310 |

FOREIGN PATENT DOCUMENTS

| | | | |
|---|---|---|---|
| 0074430 | 9/1981 | European Pat. Off. . | |
| 0453456 | 6/1968 | Fed. Rep. of Germany ...... | 439/372 |
| 2601518 | 7/1986 | France . | |
| 2179506 | 3/1987 | United Kingdom ................ | 439/372 |

Primary Examiner—Neil Abrams
Assistant Examiner—Khiem Nguyen
Attorney, Agent, or Firm—Sughrue, Mion, Zinn, Macpeak and Seas

[57] ABSTRACT

A multiconnector is composed of a stationary socket unit (FIG. 1a) and of a free plug unit (FIG. 1b). The multiconnector is able to supply both hydraulic and electric services, the hydraulic connectors being located in a sealed chamber (7). The force necessary to couple or uncouple the two units is applied via an engagement lever (10). Only one manipulator arm is necessary, first to bring the two units into alignment and then to operate the engagement lever, the two units being temporarily held by a claw (16) before the engagement lever is operated.

5 Claims, 3 Drawing Sheets

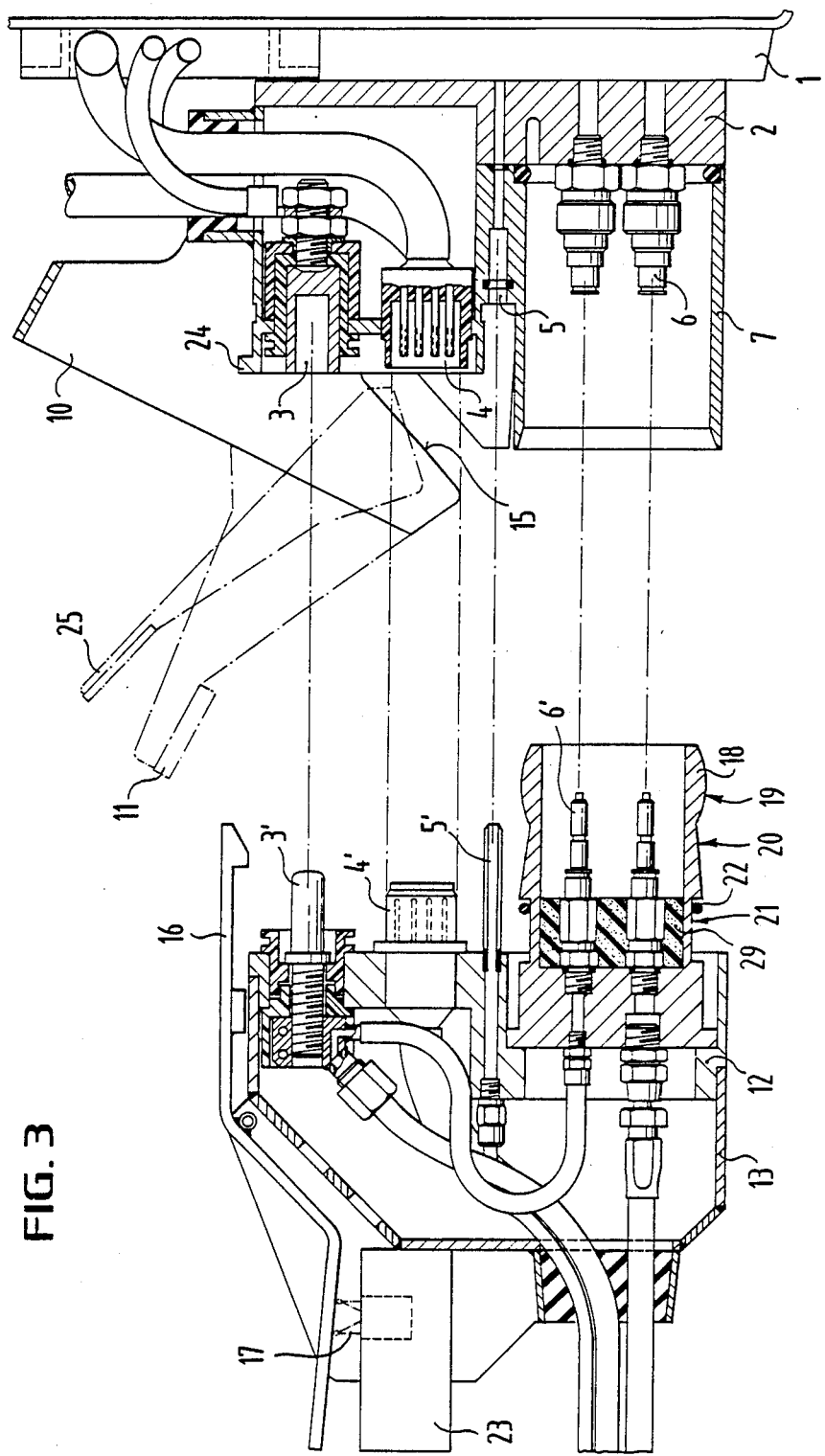

MULTICONNECTOR

FIELD OF THE INVENTION

The invention relates to a multiconnector composed of a stationary socket unit and of a free plug unit, the system comprising means for aligning both units prior to any operative engagement of the individual connectors.

BACKGROUND OF THE INVENTION

An individual connector in the sense of the present invention can be an electrical connector including a pin contact on the one hand and a spring loaded jacket on the other hand, either for transmitting low power electrical signals or for supplying electrical power to a load such as an arc welding device. The individual connector can also serve to couple pneumatic or hydraulic pipes under high or low pressure. A multiconnector assembles a great number of individual connectors of the same kind of even of different kinds.

Known multiconnectors comprise means for aligning a free plug unit to a stationary socket unit prior to any operative engagement of the individual connectors. In general, these means use guide pins which cooperate with guide holes and which have tapered or conical tips, such that the two units of the multiconnector becomes automatically aligned as soon as the guide pins enter into the corresponding guide holes.

The known multiconnectors suffer from several drawbacks, especially if they are to be coupled by remote handling. First of all, it is quite difficult to ensure a simultaneous alignment of at least two guide pins with the corresponding guide holes, if the accessibility and visibility of the multiconnector is reduced. Secondly, an alignment error during the first approach phase can entail the jamming of the whole system and necessitate an emergency intervention. Thirdly, the forces necessary to definitively engage the individual connectors all at one time are considerable and call for very powerful handling systems.

SUMMARY OF THE INVENTION

It is an object of the invention to propose a multiconnector in which the means for aligning both units prior to any operative engagement of the individual connectors are insensitive to misalignment, thus avoiding jamming of the units in an oblique position. A further object is to propose a multiconnector which can be plugged in and out by means of a relatively low power remote handling system in spite of the fact that the force to definitively engage the individual connectors is still high.

These objects are achieved by a multiconnector of the type specified above, wherein the same for aligning both units include, as an integral part of one of said units, a tube, the outer shape of which has a spherical front portion followed by a conical portion which extends up to a diameter equal to that of the sphere, the tube axis being parallel to the alignment direction, and as an integral part of the second unit, a cylindrical chamber which is conceived to be positioned in coaxial alignment with said tube and the diameter of which corresponds with slight clearance to the sphere diameter, wherein a claw is pivotably mounted on the free plug unit and latches behind a shoulder of the socket unit as soon as the conical portion of the tube penetrates into the chamber during the mutual approach of the units, that two cam followers are mounted on opposite side surfaces of one of the units and cooperate with cam slots in an engagement lever mounted on the other unit such that if the units are aligned and the lever is then operated, the cam followers penetrate into the slots and approach the two units up to the final position in which all connectors are operatively engaged.

Due to the claw which latches behind a should of the socket unit, the two units are temporarily coupled prior to any operative engagement of the individual connectors and the gripper of the remote handling system can be released without danger. The high forces necessary to perform the final approach of the two units is supplied through a force multiplication system including the engagement lever which transforms the short distance necessary for the definitive engagement of the units into a much longer distance at the end of the lever.

In a preferred embodiment of the invention, in which electrical as well as hydraulic connections are provided by the multiconnector, the hydraulic connection pipes are located inside the chamber and the alignment tube, and a resilient O-ring is located in a groove between the wall of the chamber and the tube. Thus, the electrical connectors, which are located outside the tube, are not in danger of contamination by fluids emerging from the hydraulic connectors.

It is further useful, if the multiconnector is to be operated by a telemanipulator gripper, to conceive the grasping block of the plug unit in such a way that grasping the unit implies automatic unlatching of the claw from the shoulder on the socket unit. Hence, only one telemanipulator arm is necessary for ensuring engagement or disengagement.

DETAILED DESCRIPTION OF THE INVENTION

The invention will now be described in more detail with reference to a preferred embodiment which is shown in the enclosed drawings.

Figure 1B:
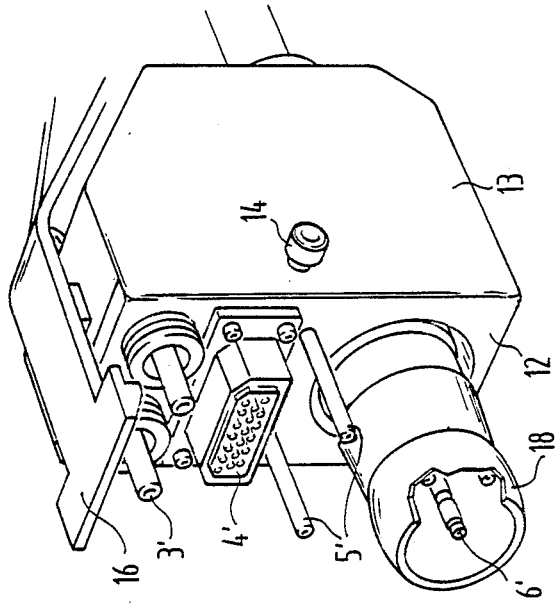
Figure 1A:
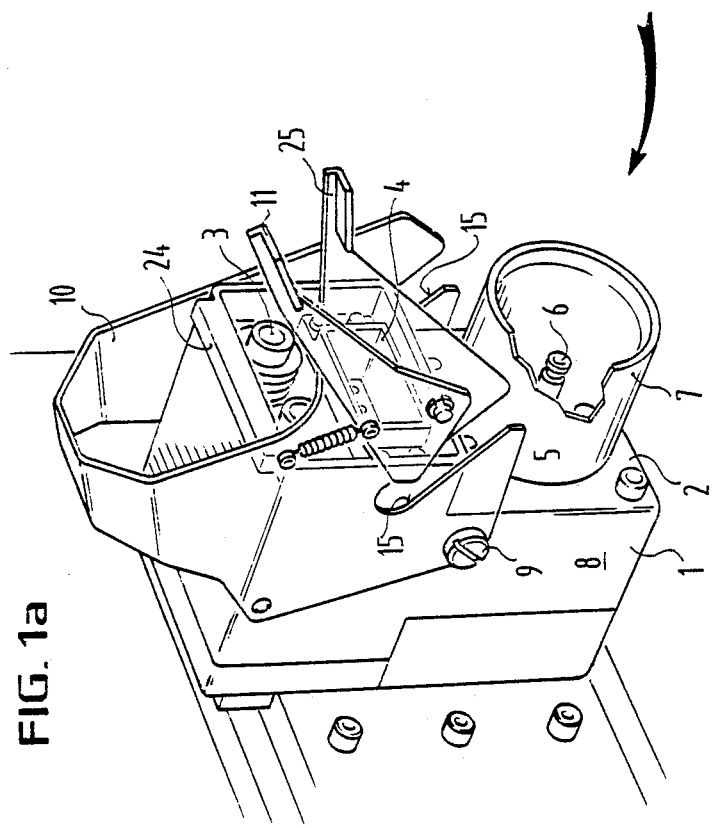

FIGS. 1a and 1b show the socket and plug units respectively in a perspective view.

Figure 2:
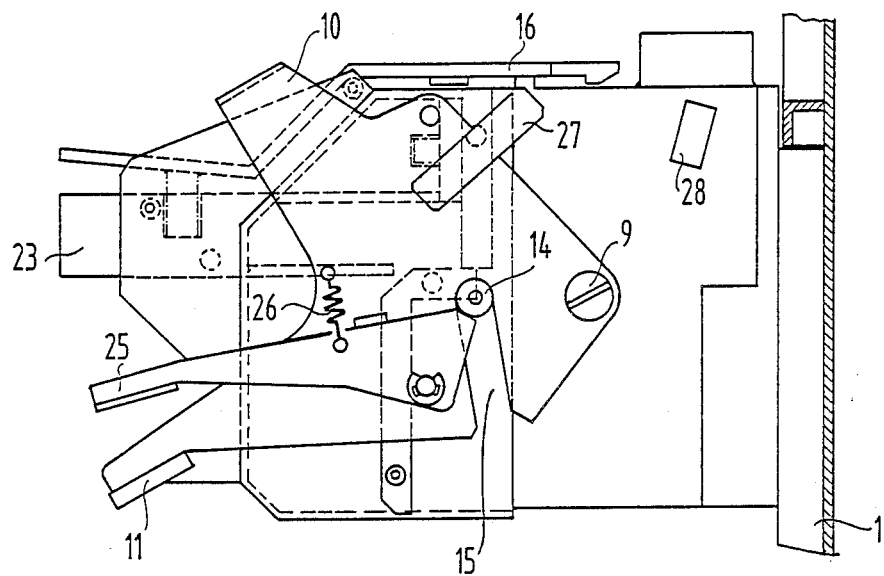

FIG. 2 constitutes a side view of the multiconnector in the fully engaged state.

FIG. 3 represents a sectional view of the same multiconnector in the fully disengaged state.

The preferred embodiment shown in the drawings concerns a remotely handled multifunction connector which has been designed to provide the connection of services for a variety of handling tools. These tools perform functions such as welding, machining, pulling and expanding. The socket portion shown in FIG. 1a is mounted on the stationary part of a servo-manipulator. The design and location enables a simple plugging-in operation with a single servo-manipulator arm. The multiconnector according to the invention is conceived to be manipulator with only one manipulator arm because the second arm is often unavailable. The services offered by the multiconnector may include a plurality of connections for electrical low power signals, for high current power supply to a welding tool, for the supply of air or another gas to a tool, for the supply of pressurized hydraulic or pneumatic fluids and for a water cooling circuit. The selection of particular services is not part of the invention. In general, there are more services available at the socket than are required by an individual plug unit. The different plugs are configured with only those connectors consistent with the needs of the tool to which the plug unit is attached via a numbilical cable.

The socket unit shown in FIG. 1a is mounted stationarily within the range of a manipulator arm. It comprises a chassis 1 of generally parallelepipedic shape, the front plate 2 of which bears the individual connectors. In this example, there are two welding junctions 3 for currents up to 100 A, a plurality of low power electrical junctions 4, four gas supply lines 5 and four liquid supply lines 6. The individual connectors are of conventional structure and need not be described in detail. The gas supply lines 5 and/or the liquid supply lines 6 are equipped wtih safety valves which are opened only by the counterpart of the supply line in the plug unit shown in FIG. 1b, when both units enter into final engagement.

Returning to the description of FIG. 1a, the liquid supply lines 6 are surrounded by a common tube which protrudes perpendicularly from the front plate 2 and defines a cylindrical chamber 7. Two opposite side plates 8 of the chassis 1 are provided with pivots 9 which support an engagement lever 10. This lever can be rotated about the pivot 9 from the open position shown in FIG. 1a to the closed position shown in FIG. 2 by pressing on an actuation plate 11, which is an integral part of the lever 10 and is mounted on a side portion thereof.

Proceeding now to FIG. 1b, it shows the complementary connectors 3', 4', 5' and 6' relating to the junctions and lines 3, 4, 5 and 6 shown in FIG. 1a. It should however be noted that two gas supply lines 5' have been eliminated, since only two gas supplies are needed for this particular tool. The individual connectors are again mounted on a front plate 12 of a chassis 13, which bears two cam followers 14 on two opposite sides perpendicular to the front plate 12. These cam followers cooperate with two cam slots 15 cut into the lateral parts of the engagement lever 10 of the socket unit shown in FIG. 1a. The plug unit of FIG. 1b further includes a claw 16, which projects beyond the front plate 12, and which is articulated on the chassis 13, the articulation axis being parallel to one of the edges of the plates 12. It is submitted to the load of a spring 17 (see FIG. 3) such that the claw, in the absence of the outer forces, is positioned as shown in FIG. 3.

The hydraulic lines 6' are surrounded by a tube 18 which protrudes from the plate 12. Its outer shape can be seen from FIG. 3: Its front portion 19 has a spherical shape, this portion being followed by a conical portion 20. The diameter of the spherical portion and the greatest diameter of the conical portion correspond with slight clearance to the inner diameter of the cylindrical chamber 7. The conical portion ends in a groove 21 in which a resilient O-ring 22 is located. The depth of the groove is slightly smaller than the diameter of the O-ring, whereas its width is considerably larger than this diameter, thus allowing the O-ring to turn around its torus axis and to reduce wear and friction forces, when the tube defining the chamber 7 slides on the tube 18.

In order to perform the coupling operation, one arm of a telemanipulator is used to grasp the plug unit by a grasping block 23 at the rear side of the chassis 13. As the rear end of the claw 16 is located close to ths grasping block, the telemanipulator simultaneously grasps this rear end and opens the claw 16 against the force of the spring 17.

The plug is then brought into an approximate alignment with the socket unit by enaging the spherical portion 19 of the tube 18 into the chamber 7 of the socket unit. A tapering at the end faces facilitates this operation. When the plug unit is pressed into the socket, firstly the spherical portion and then the conical portion of the tube 18 urge the connector halves into axial alignment. An angular alignment is ensured either by the welding power connections 3, 3', or by any other protruding wall such as the engagement lever 10. By further approaching the plug unit to the socket unit, the claw 16 becomes engaged behind a shoulder 24 on the socket unit side.

The engagement force is achieved this condition amounts to only a few grammes, as none of the connectors is yet operatively and definitively engaged. To close the multiconnector definitively by approaching the units for the last 15 mm, an axial force is required which exceeds the capability of one arm of a telemanipulator. In this phase of approach, however, the cam followers 14 are situated at the entry of the cam slots 15 such that by pressing down the engagement lever 10, the cam followers enter into these slots and draw the plug unit into the final position. This can be achieved by the same telemanipulator arm which has been used before to approach the plug unit. As soon as the grasping block 23 is released by the telemanipulator, the claw 16 is latched behind the shoulder 24 and secures the plug unit with respect to the socket unit. The telemanipulator can then grasp the actuation plate 11 of the engagement lever 10 and push it down. The engagement lever 10 thus acts as force amplifier and urges the plug unit into the final engagement position shown in FIG. 2.

In order to avoid any involuntary release, a safety locker 25 is pivotably mounted to the engagement lever 10 and is urged by a spring 26 into a locking position in which one of the cam followers is locked at the bottom of the corresponding cam slot 15. Release is only possible by urging the safety locker 25 against the load of the spring 26 to liberate the cam slot 15.

For decoupling the multiconnector units, again only one telemanipulator is used. It grasps the actuation plate 11 of the engagement lever 10 together with the safety locker. By pushing back the engagement lever 10, the cam followers are urged out of the cam slots 15 and the plug unit is repelled into the temporary engagement position in which the units are only held together by the claw 16. Now, the telemanipulator may release the actuation plate 11 and grip again the grasping block 23 together with the rear end of the claw 16 and withdraw the plug unit from the socket unit. The socket unit is now ready to receive the plug unit of another tool.

In order to maintain the engagement lever 10 in its upper position, a resilient plate 27 may be attached thereto, which is conceived to slide over a protrusion mounted on the chassis 1 of the socket unit.

Due to the particular shape of the outer surface of the tube 18, the telemanipulator operator need not invest a high accuracy for approaching the plug unit to the socket unit. This shape ensures a self-centering function without entailing a danger of jamming due to an incorrect positioning. In the fully engaged position, the cylindrical chamber containing the liquid supply lines 6, 6' is perfectly sealed against the electrical connections. However, a small loss of fluid is inevitable when the connectors are uncoupled, and this might be absorbed by a piece of sponge 29 located in the tube 18. When in the fully engaged position, the chamber containing the liquid supply lines is sealed by means of the O-ring 22, a vent through the socket unit ensuring that any leak is safely released and no build-up of pressure is possible. Thus the multiconnector according to the invention can be used in any orientation without any substantial danger of contamination of the electrics with liquid.

The invention is not limited to the preferred embodiment described above. Thus, a second claw might be employed opposite to the first one in order to improve the security against accidental dropping of the plug unit during the coupling and uncoupling operations. Both claws might be grasped together with the grasping block 23 by one telemanipulator.

Further, the multiconnector according to the invention might be conceived for a manual operation without manipulator. In this case, the grasping block would be adapted to the operator's hands and the operator would again only need one hand to operate the multiconnector without investing a high precision of the approach movement and without employing an excessive force to ensure the final engagement of all individual connectors.

Even if no liquid connections must be provided, and thus no protection against contamination of the electrical connections is necessary, the specially shaped tube 18 in cooperation with the chamber 7 still facilitates the approach of the two units and ensures a precise alignment prior to the final engagement. In this case, the free space inside the tube 18 may be employed for pneumatic or electrical services.

I claim:

1. A multiconnector composed of a stationary socket unit and of a free plug unit, the system comprising means for aligning both units prior to any operative engagement of the individual connectors, wherein the means for aligning both units include, as an integral part of one of said units, a tube (18), having an outer shape which has a spherical front portion (19) followed by a conical portion (20) which extends up to a diameter equal to that of the sphere, the tube having an axis parallel to the alignment direction, and as an integral part of the second unit, a cylindrical chamber (7) positioned in coaxial alignment with said tube (18) and having a diameter corresponding with slight clearance to the sphere diameter, wherein at least one claw (16) is pivotably mounted on the plug unit, said socket unit including a shoulder, said claw latching behind said shoulder (24) of the socket unit (FIG. 1a) as soon as the conical portion (20) of the tube (18) penetrates into the chamber (7) during the mutual approach of the units, wherein an engagement lever (10) is mounted to the other unit, two cam followers (14) are mounted on opposite side surfaces of one of the units (FIG. 1b) and engage cam slots (15) in said engagement lever (10) mounted on the other unit such that if the units are aligned and the lever is then operated, the cam followers (14) penetrate into the cam slots (15) and move the two units up to a final position with connections (3, 4, 5, 6) operatively engaged.

2. A multiconnector according to claim 1, wherein electrical and hydraulic connections are provided by the multiconnector, hydraulic connection pipes are located inside the cylindrical chamber (7) and the tube (18) respectively, a resilient O-ring (22) is located in a circular groove (21) situated at the rear end of the conical tube portion (20), and electrical connections are located outside of said cylindrical chamber (7).

3. A multiconnector as claimed in claim 2, wherein the groove (21) has a rectangular cross-section and is considerably larger than the O-ring (22).

4. A multiconnector as claimed in claim 1, wherein the claw (26) rear end has a remote from the latch, extending to a grasping block (23) to function as a remotely handled gripper such that grasping the free plug unit effects unlatching of the claw (16) from said shoulder (24) on the socket unit (FIG. 1a).

5. A multiconnector as claimed in claim 1 further comprising a spring loaded safety locker (25, 26) operatively mounted to the engagement lever (10) to protect the lever in said final position against involuntary release.

* * * * *